Feb. 16, 1937.   G. AJDUKOVICH   2,071,013
CARBURETOR CONTROL FOR AUTOMOBILES
Filed July 16, 1936
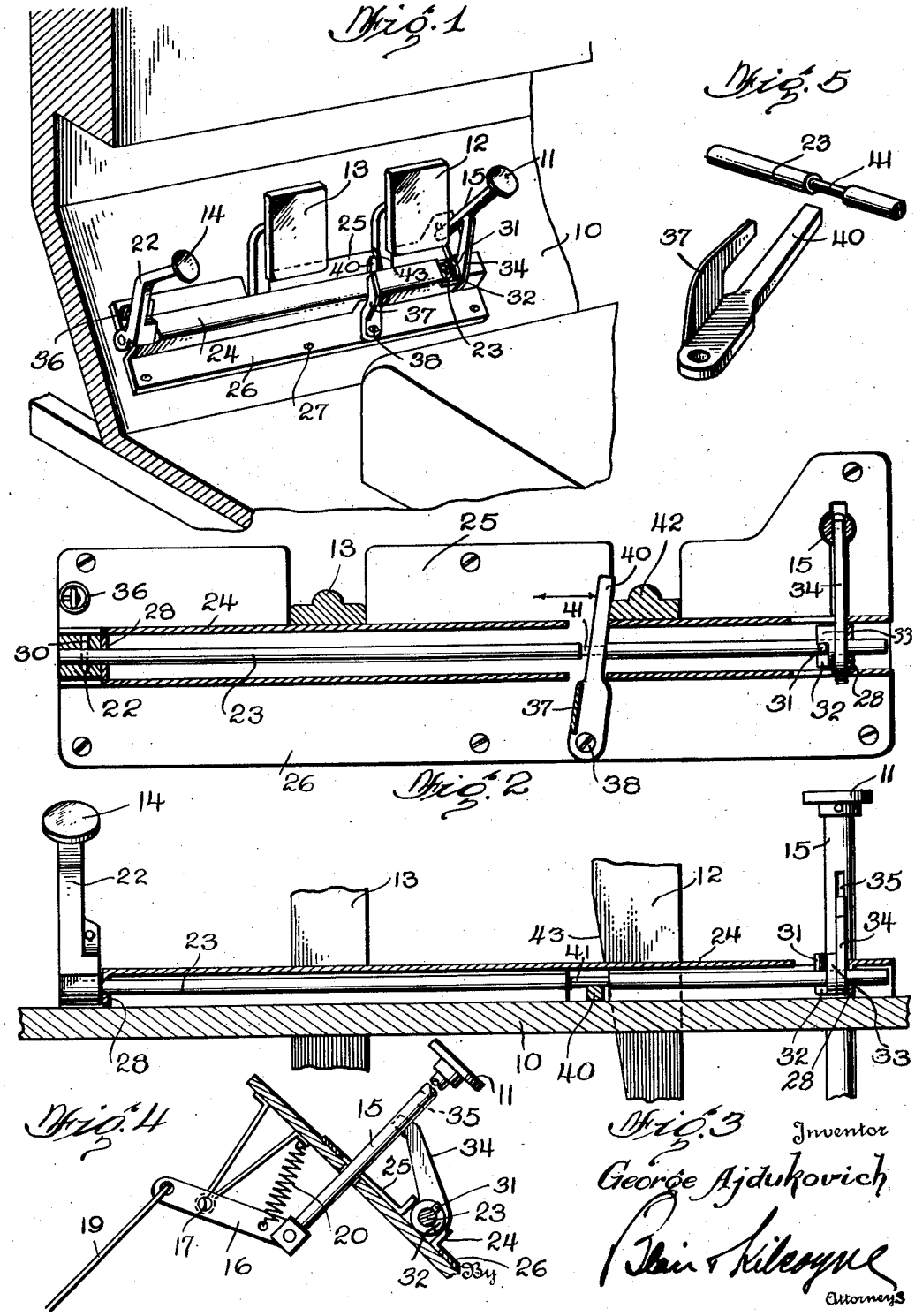
Inventor
George Ajdukovich Patented Feb. 16, 1937

2,071,013

UNITED STATES PATENT OFFICE 2,071,013

CARBURETOR CONTROL FOR AUTOMOBILES

George Ajdukovich, St. Louis, Mo.

Application July 16, 1936, Serial No. 91,004

9 Claims. (Cl. 192—3)

This invention relates to carburetor controls and more particularly to means for controlling the accelerator controls associated with an automobile carburetor by either foot.

The present invention is an improvement over the construction disclosed in my prior Patent No. 1,843,090, dated January 26, 1932, and one of the objects of the invention is to simplify the aforesaid construction and to reduce its cost of manufacture. A further object is to provide a more reliable and efficient mechanism of the above general character which may be less expensively manufactured, assembled, and applied to automobiles now in general use, without material alteration or additions to the standard control parts. A further object of the present invention is to provide an improved mechanism of the above general character which may be conveniently mounted upon an automobile and easily and quickly connected with the present accelerator pedal, whereby the automobile may be driven under the control of either the right or left foot, as desired, thus greatly relieving the strain on the driver when making long trips.

Other objects will be in part obvious from the annexed drawing and in part hereinafter indicated in connection with the following analysis of this invention.

This invention accordingly consists in the features of construction, combination of parts, and in the unique relation of the members and in the relative proportioning and disposition thereof, all as more completely outlined herein.

To enable others skilled in the art fully to comprehend the underlying features of this invention, that they may embody the same by the numerous modifications in structure and relation contemplated by the invention, a drawing depicting a preferred form of the invention has been annexed as a part of this disclosure, and in such drawing like characters of reference denote corresponding parts throughout all of the views, in which—

Fig. 1 is a perspective view, partly in section, showing the essential parts of the dual control mechanism in an automobile;

Fig. 2 is a detail plan view, partly in section, showing the complete mechanism;

Fig. 3 is a detail sectional view showing the same parts as in Fig. 2;

Fig. 4 is a detail view, partly in section, showing the usual accelerator pedal and its connection with the attachment;

Fig. 5 is a detail perspective view of certain parts of the mechanism.

Referring now to the drawing in detail, 10 indicates the floor-board of an automobile which is provided with the usual accelerator pedal 11 normally at the right and adapted to be actuated by the right foot of the driver. Adjacent this accelerator pedal 11 is the usual foot brake pedal 12 and clutch pedal 13, while near the left side of the car is a second or auxiliary accelerator pedal 14 adapted to be actuated by the left foot, all as will be more fully set forth hereinafter.

To those who are familiar with driving automobiles, it may be stated that, especially when on long trips, the driver's right foot becomes cramped from being kept constantly in the same position on the accelerator pedal 11. By means of the present invention, he may shift over and use his left foot on the pedal 14 when desired, thus being free to move his right foot from the cramped position. In so doing he knows there is no danger of accident with the present construction for, according to this invention, if and when he puts his right foot on the brake 12 while even accidentally holding the accelerator pedal 14 down with his left foot, the carburetor actuating mechanism will be disconnected and the engine assume idling speed. Mechanism is therefore provided, as will now be described, for controlling the carburetor from either pedal 11 or 14 and for automatically disconnecting the pedal 14 from the gas control or carburetor when the foot brake 12 is applied.

The accelerator pedal 11 is provided with a stem 15 connected to one arm 16 of a linkage mechanism pivoted at 17, the other end being connected as by wire 19, in any well known manner, with the carburetor (not shown). A spring 20 normally holds the accelerator pedal in raised position, as shown in Fig. 4.

The auxiliary pedal 14 is provided with a stem 22 (Fig. 3) having at its lower end a connection with a longitudinally extending rock shaft 23 which is mounted within a casing 24 of generally rectangular shape, as shown more clearly in Fig. 1, this casing being secured by side flanges 25 and 26 with the floor-board 10 of the car as by means of screws 27. The ends of this rectangular casing 24 have downwardly extending ears 28 near each end, which act as bearings for the shaft 23. This shaft is free to move longitudinally within certain limits and also to oscillate in the bearings 28 when either of the pedals 11 or 14 is depressed. This shaft, as shown more clearly in Fig. 2, has a fixed connection with the pedal stem 22 as by means of set screw 30 while the opposite end is provided with a pin 31 which coacts with a notch 32 in a collar 33 surrounding the shaft 23 and forming one part of a lever 34, the end of which has a slotted engagement as at 35 with the stem 15 of the accelerator pedal 11. Thus when the parts are in the position shown in Fig. 2, a downward pressure upon either of the pedals 11 or 14 will cause the gas control mechanism illustrated in Fig. 4 to function in a well known manner. The spring 20 will return the pedal 11 to normal position while spring 36 (Fig. 1) will return the pedal 14.

Interposed between the pedals 12 and 13 is a pivotally mounted latch member 37 shown more clearly in Fig. 5. This is secured to the attachment by means of a pivot pin 38 as shown in Fig. 2 and has an extension 40 adapted to engage a reduced portion 41 in the shaft 23. Thus when the latch 37 is engaged by the foot of the driver the shaft 23 is moved towards the right, thereby to urge the pin 31 into the recess 32 and thus connect the accelerator pedal 14 with the gas control mechanism.

The stem 42 of the clutch pedal 12, as shown in Fig. 3, is provided with a cam surface 43 which is adapted to engage the extension 40 of the latch member when it is depressed and move the shaft or rod 23 relatively towards the left as shown in Fig. 3. Such longitudinal movement towards the left will immediately carry the pin 31 out of its recess 32 and disconnect the accelerator pedal 14 from the gas control mechanism. Such an arrangement makes it impossible for one to accidentally or unintentionally hold the accelerator pedal 14 down with the left foot to maintain the high speed of the engine while applying the brake with the right foot. The parts are thus automatic and foolproof in disconnecting the auxiliary pedal from the gas control.

The operation of the present device will be clear to those familiar with the subject from the above description, but is briefly stated as follows:—

In normal operation, the accelerator pedal is actuated to control the speed of the car through the linkage conventionally disclosed in Fig. 4. If and when desired, the operator may shift the position of his feet and control the speed of the engine through the auxiliary pedal 14 and the attachment mechanism above described. This merely necessitates a lateral movement towards the right of the latch member 37 by one foot, whereupon the parts are connected as in the manner disclosed in Fig. 2. A depression of the brake pedal 12, however, causes an actuation of the cam mechanism 43 to move the shaft 23 towards the left, thereby to disconnect the shaft 23 from the pedal 11, thereby allowing this pedal 11 to return to its normal position giving idling speed to the engine. Thereafter the operator may resume driving with his right foot if he so desires or merely actuates the latch 37 to reconnect the auxiliary pedal 14.

The invention is of simple and practical construction, having relatively few parts which may be inexpensively manufactured and assembled. The device is also foolproof, reliable and efficient in its operation, and as an attachment may be quickly applied to the single-pedal control mechanisms now in general use without material modification or alteration.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:—

1. An attachment for the speed control of motor vehicles, having a main accelerator pedal and a brake pedal, comprising, in combination, an auxiliary accelerator pedal, an axially and rotatably movable rod connecting the auxiliary pedal with the main pedal, and means operative between said rod and the brake pedal for interrupting this connection when said brake pedal is actuated.

2. An attachment for the accelerator control of motor vehicles having a main accelerator pedal and a brake pedal, comprising, in combination, an auxiliary accelerator pedal, a rod having a fixed connection with the auxiliary pedal and a detachable connection with the main accelerator pedal, and means responsive to brake pedal actuation for shifting said rod longitudinally to interrupt said last connection.

3. An attachment for the accelerator control of motor vehicles having a main accelerator pedal and a brake pedal, comprising, in combination, a supporting plate adapted to be secured to the vehicle, an auxiliary accelerator pedal, a rod supported from said plate and having means operatively connected with the auxiliary accelerator pedal and the main accelerator pedal, and means responsive to brake pedal actuation for shifting said rod longitudinally to interrupt one of such connections, said means including a cam operative between the rod and the brake pedal.

4. An attachment for the accelerator control of motor vehicles having a main accelerator pedal and a brake pedal, comprising, in combination, a supporting plate adapted to be secured to the vehicle, an auxiliary accelerator pedal, a rod supported from said plate and having connections with the auxiliary accelerator and the main accelerator, and means for shifting said rod longitudinally to interrupt one of said connections, said means including a cam on the brake pedal, and means for returning the parts to normal position after disconnecting movement.

5. In a motor vehicle, in combination, a brake pedal, an accelerator pedal, and an attachment comprising an auxiliary accelerator, and connections between the auxiliary accelerator and main accelerator whereby the car may be controlled by either foot, and means operative between the brake pedal and said attachment for disconnecting the auxiliary accelerator when the brake is actuated including an axially movable and rotatable shaft.

6. In a motor vehicle, in combination, a brake pedal, an accelerator pedal, and an attachment comprising an auxiliary accelerator pedal, and connections between the auxiliary accelerator pedal and main accelerator pedal whereby the vehicle may be controlled by either foot, and means for disconnecting the auxiliary pedal when the brake pedal is actuated, said means including an axially movable and rotatable shaft, and means adapted to be actuated by the brake pedal for producing such longitudinal movement.

7. In a motor vehicle, in combination, a brake pedal, an accelerator pedal, an attachment comprising an auxiliary pedal and connections including a rock shaft between the auxiliary and main accelerator pedals whereby the speed of the vehicle may be controlled by either foot, means operative between the brake pedal and said attachment for disconnecting the auxiliary pedal when the brake pedal is actuated, said means including elements actuable by the brake pedal for producing axial movement of the rock shaft, and means for returning the accelerator pedals to normal position.

8. In combination with an accelerator pedal and brake pedal of an automobile, an attachment for providing dual control of the speed of the vehicle comprising a plate adapted to be mounted upon the vehicle, an auxiliary pedal operable through said plate, spring means normally holding said pedal in raised position, an axially movable rock shaft mounted on said plate and having its ends connected with the main accelerator pedal, and means operative between said rock shaft and the brake pedal adapted to move the rock shaft axially on depression of the brake, thereby to disconnect the auxiliary accelerator pedal from the main accelerator.

9. In combination with an accelerator pedal and brake pedal of an automobile, an attachment for providing dual control of the speed of the vehicle comprising a plate adapted to be mounted upon the vehicle, an auxiliary pedal operable through said plate, spring means normally holding said pedal in raised position, an axially movable rock shaft mounted on said plate and having its ends connected with the main accelerator pedal, means operative between said rock shaft and the brake pedal adapted to move the rock shaft axially on depression of the brake, thereby to disconnect the auxiliary accelerator pedal from the main accelerator, and manually controlled means for reconnecting the auxiliary pedal to the control mechanism on release of the brakes.

GEO. AJDUKOVICH.